US012680338B2

(12) United States Patent
Kuenzi et al.

(10) Patent No.: US 12,680,338 B2
(45) Date of Patent: Jul. 14, 2026

(54) DOOR LATCH ASSEMBLY WITH WIRELESS OVERLOCK

(71) Applicant: Carrier Corporation, Palm Beach Gardens, FL (US)

(72) Inventors: Adam Kuenzi, Salem, OR (US); Thomas Grinter, Salem, OR (US); Jon Luebeck, Salem, OR (US); Matthew Hill, Sublimity, OR (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 411 days.

(21) Appl. No.: 18/187,046

(22) Filed: Mar. 21, 2023

(65) Prior Publication Data

US 2023/0304319 A1 Sep. 28, 2023

Related U.S. Application Data

(60) Provisional application No. 63/322,706, filed on Mar. 23, 2022.

(51) Int. Cl.

| | |
|---|---|
| ***E05B 17/20*** | (2006.01) |
| ***E05B 17/22*** | (2006.01) |
| ***E05B 39/04*** | (2006.01) |
| ***E05B 45/12*** | (2006.01) |
| ***E05B 59/00*** | (2006.01) |

(Continued)

(52) U.S. Cl.

CPC ...... *E05B 17/2026* (2013.01); *E05B 17/2092* (2013.01); *E05B 17/22* (2013.01); *E05B 39/04* (2013.01); *E05B 45/12* (2013.01); *E05B 59/00* (2013.01); *E05B 63/0065* (2013.01); *E05B 2047/0069* (2013.01); *E05B 2063/0082* (2013.01)

(58) Field of Classification Search

CPC ...... E05B 65/0021; E05B 65/48; E05B 67/38; E05B 67/383; E05B 63/0065; E05B 2063/0082; Y10T 292/1021

See application file for complete search history.

(56) References Cited

U.S. PATENT DOCUMENTS 3,866,164 A 2/1975 Peterson
4,225,164 A * 9/1980 Wensley ............ E05B 47/0002 292/144

(Continued)

FOREIGN PATENT DOCUMENTS

DE 102019009058 A1 6/2021
EP 4183972 A1 * 5/2023 ............... E05C 1/10
GB 2212847 A * 8/1989 ......... E05B 17/0062

OTHER PUBLICATIONS

European Search Report for Application No. 23163584.8, Issued Sep. 14, 2023, 7 Pages.

*Primary Examiner* — Carlos Lugo
(74) *Attorney, Agent, or Firm* — CANTOR COLBURN LLP

(57) ABSTRACT

A door latch assembly includes a housing; a bolt configured to the extend from the housing in a first direction and retract into the housing in a second direction; a handle connected to the bolt; a lockable, blocking member configured to prevent movement of the bolt; a controller configured to place the door latch assembly into an overlock mode; an actuator in communication with the controller, the actuator configured to prevent movement of the bolt in the overlock mode.

18 Claims, 13 Drawing Sheets

(51) Int. Cl.

| | |
|---|---|
| ***E05B 63/00*** | (2006.01) |
| *E05B 47/00* | (2006.01) |
| *E05B 65/00* | (2006.01) |

(56) References Cited

U.S. PATENT DOCUMENTS

| | | | | |
|---|---|---|---|---|
| 4,254,582 | A * | 3/1981 | McGee | E05B 47/026 49/199 |
| 5,311,168 | A | 5/1994 | Pease, Jr. et al. | |
| 5,490,698 | A | 2/1996 | Dezso | |
| 5,852,944 | A | 12/1998 | Collard, Jr. et al. | |
| 6,666,054 | B1 | 12/2003 | Hsieh | |
| 6,719,334 | B1 * | 4/2004 | Curtis | E05C 1/04 292/281 |
| 7,221,273 | B1 | 5/2007 | Seyfarth | |
| 7,872,577 | B2 | 1/2011 | Frolov | |
| 7,880,585 | B1 | 2/2011 | Aronson et al. | |
| 8,640,513 | B2 | 2/2014 | Goren et al. | |
| 8,783,074 | B2 * | 7/2014 | Madruga | E05B 67/383 70/164 |
| 9,187,929 | B2 | 11/2015 | Webb et al. | |
| 9,728,022 | B2 | 8/2017 | Gengler et al. | |
| 10,062,231 | B2 | 8/2018 | Zastrow et al. | |
| 10,487,541 | B1 | 11/2019 | Zhang et al. | |
| 10,669,744 | B2 | 6/2020 | Arnold et al. | |
| 10,947,756 | B2 | 3/2021 | Vanmeter | |
| 11,049,345 | B2 | 6/2021 | Grzenda et al. | |
| 11,170,597 | B2 * | 11/2021 | Roper | G07C 9/37 |
| 12,146,345 | B2 * | 11/2024 | Chiti | G07C 9/00571 |
| 2005/0237149 | A1 | 10/2005 | Loftin et al. | |
| 2008/0127687 | A1 * | 6/2008 | Henson | E05B 67/383 70/129 |
| 2009/0058596 | A1 * | 3/2009 | Sohanta | E05B 47/068 340/5.53 |
| 2009/0260407 | A1 * | 10/2009 | Henson | E05C 1/04 70/129 |
| 2021/0054661 | A1 | 2/2021 | Mantena et al. | |
| 2021/0366220 | A1 | 11/2021 | Roper et al. | |
| 2022/0049524 | A1 | 2/2022 | Luebeck | |
| 2023/0287711 | A1 * | 9/2023 | Chiti | E05B 63/18 |

* cited by examiner

DOOR LATCH ASSEMBLY WITH WIRELESS OVERLOCK

CROSS-REFERENCE TO RELATED APPLICATIONS

This application claims the benefit of U.S. Provisional Application No. 63/322,706, filed Mar. 23, 2022, all of which are incorporated herein by reference in their entirety.

BACKGROUND

The present disclosure relates to door latch assemblies, and more specifically, to a door latch assembly with wireless overlock capability.

Existing door latch assemblies are used to prevent opening of a door, such as a door to a storage unit. A user may place a personal lock on the door lock assembly to prevent the door from being opened. In certain situations, a second lock, commonly referred to as an overlock, is used to prevent the user from opening the door (e.g., when the tenant is delinquent paying rent on the unit). Existing overlocks are physical devices and must be installed and removed physically by an individual.

BRIEF DESCRIPTION

According to an embodiment, a door latch assembly includes a housing; a bolt configured to the extend from the housing in a first direction and retract into the housing in a second direction; a handle connected to the bolt; a lockable, blocking member configured to prevent movement of the bolt; a controller configured to place the door latch assembly into an overlock mode; an actuator in communication with the controller, the actuator configured to prevent movement of the bolt in the overlock mode.

In addition to one or more of the features described herein, or as an alternative, further embodiments may include a vibration sensor; wherein the controller is configured to place the door latch assembly into the overlock mode in response to the vibration sensor.

In addition to one or more of the features described herein, or as an alternative, further embodiments may include wherein the controller is configured to place the door latch assembly into the overlock mode in response to a message from a remote system.

In addition to one or more of the features described herein, or as an alternative, further embodiments may include a position sensor in communication with the controller; the position sensor configured to detect if the bolt is extended from the housing in the first direction or retracted into the housing in the second direction.

In addition to one or more of the features described herein, or as an alternative, further embodiments may include a communication module configured to provide communication between the controller and a remote system.

In addition to one or more of the features described herein, or as an alternative, further embodiments may include wherein the controller places the door latch assembly into the overlock mode in response to a message from the remote system.

In addition to one or more of the features described herein, or as an alternative, further embodiments may include wherein the actuator comprises a motor.

In addition to one or more of the features described herein, or as an alternative, further embodiments may include wherein the actuator comprises a stop.

According to another embodiment, a method of operating a door latch assembly includes determining, at a remote system, that an overlock mode is required at the door latch assembly; sending, from the remote system to the door latch assembly, a message to enter the overlock mode.

In addition to one or more of the features described herein, or as an alternative, further embodiments of the method may include detecting at the door latch assembly that a bolt has been extended; sending a closed message from the door latch assembly to the remote system.

In addition to one or more of the features described herein, or as an alternative, further embodiments of the method may include storing the closed message in an audit record contained in memory of the door latch assembly.

In addition to one or more of the features described herein, or as an alternative, further embodiments of the method may include detecting at the door latch assembly that a bolt has been retracted; sending an open message from the door latch assembly to the remote system.

In addition to one or more of the features described herein, or as an alternative, further embodiments of the method may include storing the open message in an audit record contained in memory of the door latch assembly.

In addition to one or more of the features described herein, or as an alternative, further embodiments of the method may include sending the open message to a user.

In addition to one or more of the features described herein, or as an alternative, further embodiments of the method may include periodically sending a status message from the door latch assembly to the remote system.

In addition to one or more of the features described herein, or as an alternative, further embodiments of the method may include the remote system initiating maintenance of the door latch assembly in response to a missing status message.

In addition to one or more of the features described herein, or as an alternative, further embodiments of the method may include sensing vibration at the door latch assembly; sending an attack message from the door latch assembly to the remote system in response to the sensed vibration.

In addition to one or more of the features described herein, or as an alternative, further embodiments of the method may include determining, at the remote system, that the overlock mode is not required at the door latch assembly; providing a credential to the door latch assembly to end the overlock mode.

Technical effects of embodiments of the present disclosure include the ability to wirelessly provide an overlock at a door latch assembly.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
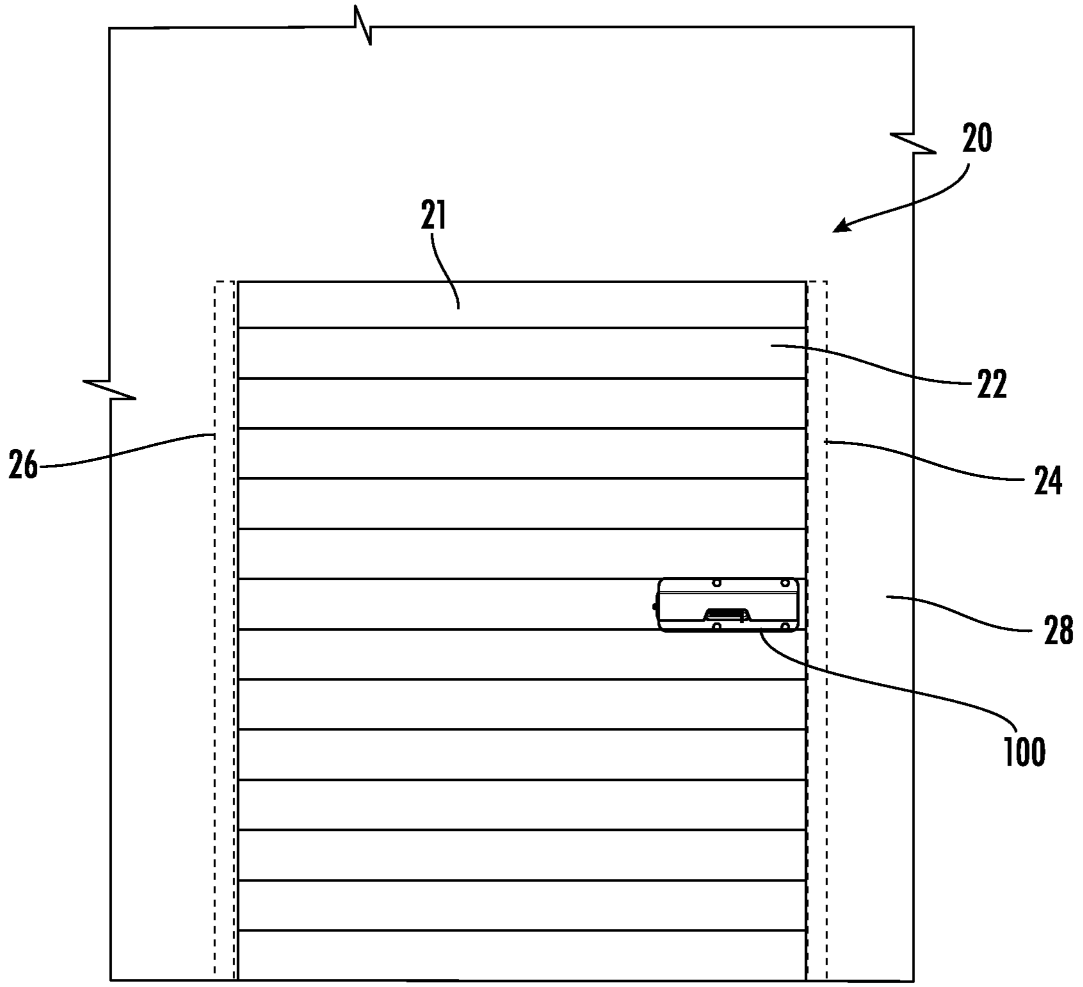
FIG. 1 depicts a door with a door latch assembly in an example embodiment.

FIG. 1 depicts an example environment where a door latch assembly of the present disclosure may be used. FIG. 1 depicts the exterior of a vertical door assembly 20, such as a rollup or overhead style door, which may be a door to a storage unit in certain instances. The vertical door assembly 20 includes a door 21 made up of a plurality of slats 22 that are rotatably connected to each other along their length and slideably connected to a first vertical guide rail 24 and a second vertical guide rail 26 along respective opposite ends of the slats 22. The door 21 may alternatively made from a continuous, corrugated sheet. The first vertical guide rail 24 and the second vertical guide rail 26 are positioned at an interior of the vertical door assembly 20. In the illustrated example, the vertical door assembly 20 is used to selectively enclose an opening in a wall 28. The wall 28 could be a wall of a building, a shipping container, a trailer, storage unit, or any other type of arrangement where it is desirable to selectively enclose an opening in a structure. The vertical door assembly 20 prevents access to a space behind the wall 28. The door 21 may also be a hinged door, that swings open, rather than a rollup door.

Figure 2:
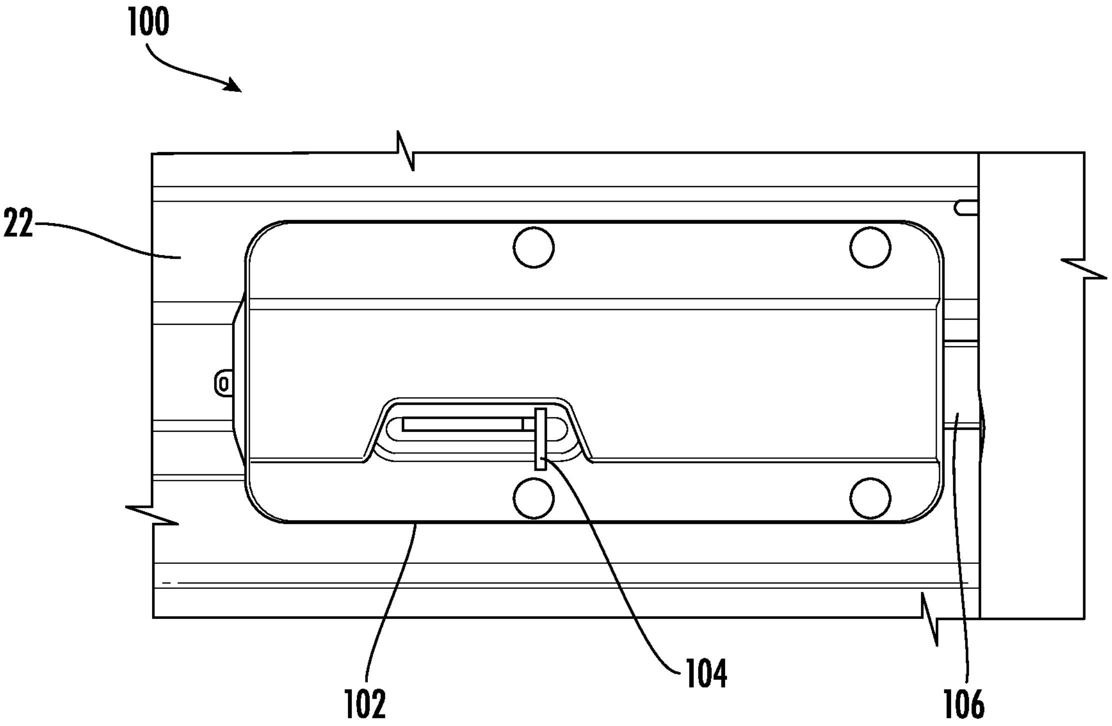
FIG. 2 depicts a door latch assembly in an example embodiment.

A door latch assembly 100 is provided to secure the door 21 in a closed position. Referring to FIG. 2, the door latch assembly 100 includes a housing 102. The door latch assembly 100 is mounted in a corrugation of the slats 22 by fasteners, such as bolts. The door latch assembly 100 includes a handle 104 connected to a bolt 106. The handle 104 and the bolt 106 slide in two directions. When moved in a first direction (e.g., to the right in FIG. 2), the bolt 106 is extended from the housing 102 and engages a recess in the wall 28 or the guide rail 24/26 to prevent the door 21 from opening. When moved in a second direction (e.g., to the left in FIG. 2), the bolt 106 is retracted towards the housing 102 and removed from the recess in the wall or the guide rail 24/26 to allow the door 21 to open.

Figure 3:
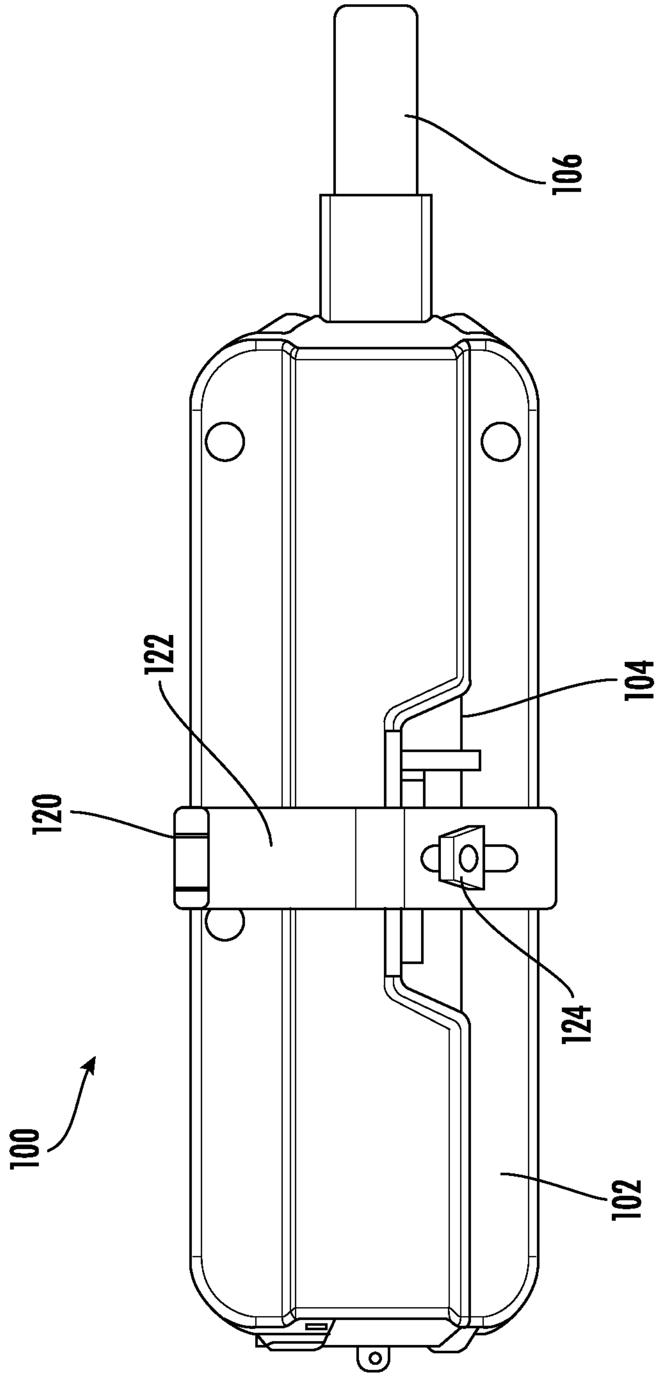
FIG. 3 depicts a door latch assembly in an example embodiment.

Referring to FIG. 3, the door latch assembly 100 includes a lockable, blocking member. In FIG. 3, the lockable, blocking member includes a hasp 120 having a strap 122 hingedly mounted to a top of the housing 102 and a staple 124 mounted at a bottom of the housing 102. The staple 124 includes an opening to receive a lock. In the locked position shown in FIG. 3, the hasp 120 is next to the handle 104 and prevents movement of the handle 104 in the second direction, thereby preventing opening of the door 21. When the hasp 120 is unlocked, the strap 122 may be hinged away from the housing 102, allowing the handle 104 and the bolt 106 to move in the second direction (e.g., to the left in FIG. 3).

Figure 4B:
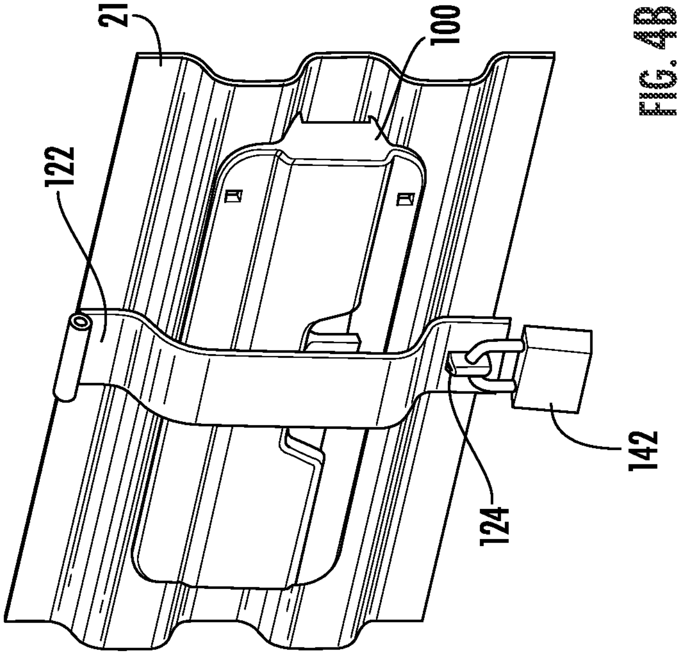
FIGS. 4A and 4B depict a door latch assembly in an example embodiment.
Figure 4A:
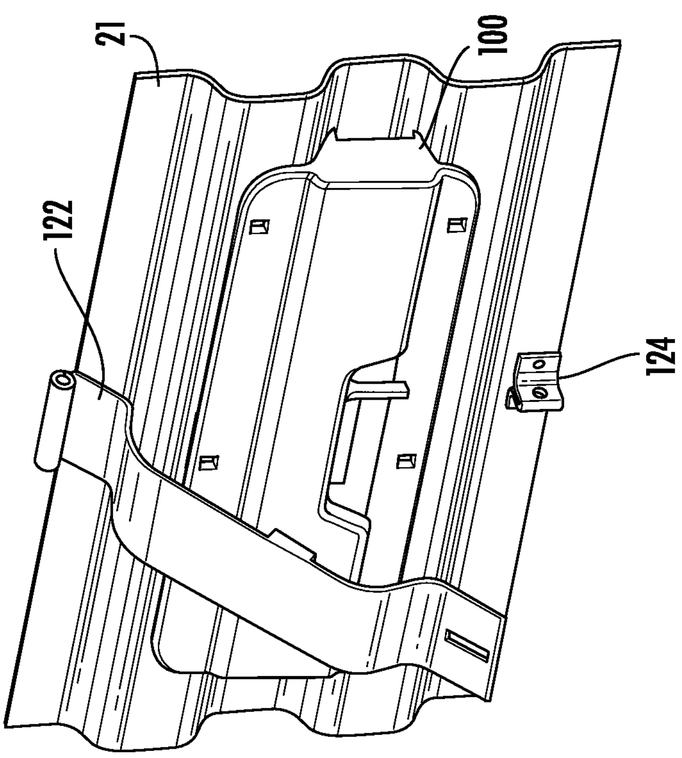

FIG. 4A depicts a lockable, blocking member in another embodiment. The lockable, blocking member includes a hasp having a strap 122 and staple 124. The strap 122 is hingedly mounted to the door 21, rather than the housing 102 as shown in FIG. 3. The staple 124 is also mounted to the door 21. FIG. 4B shows the strap 122 in a closed position with a lock 142 inserted through the staple 124. When the lock 142 is removed, the strap 122 may be hinged away from the housing 102, allowing the handle 104 and bolt 106 to move in the second direction (e.g., to the left in FIG. 4A).

Figure 5:
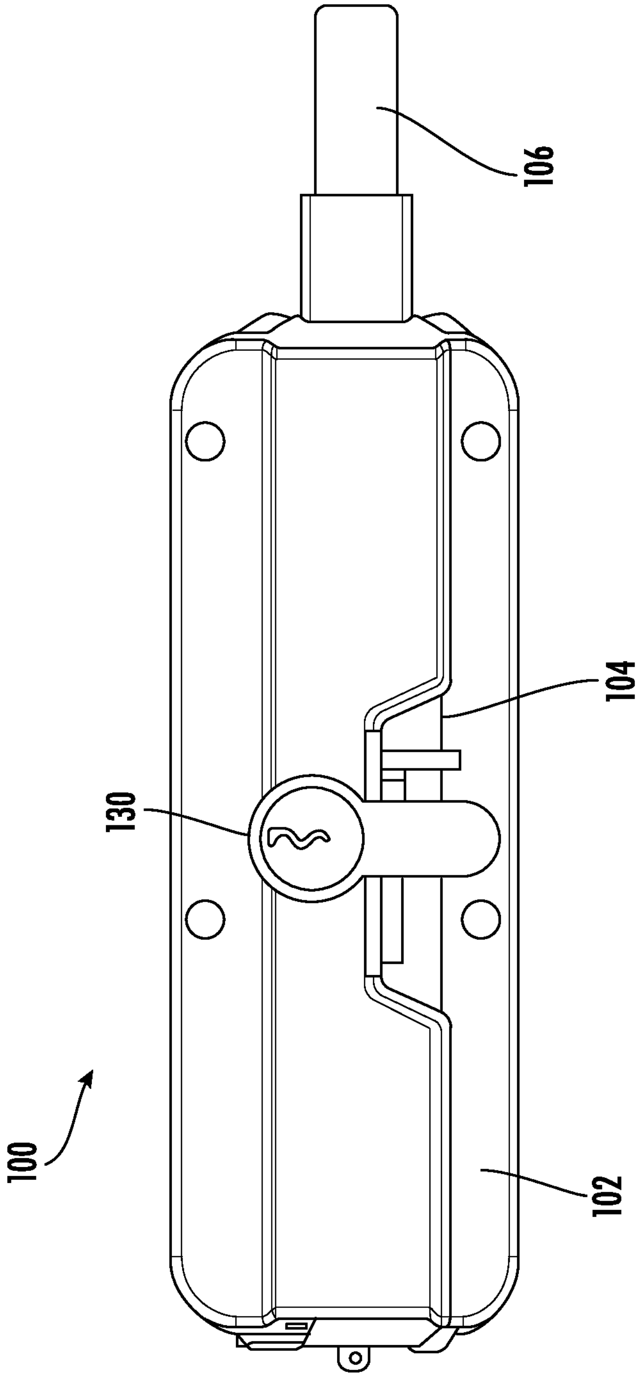
FIG. 5 depicts a door latch assembly in an example embodiment.

FIG. 5 depicts a lockable, blocking member in another embodiment. In FIG. 5, the lockable, blocking member is a cylinder lock 130. The cylinder lock 130 is placed next to handle 104. In the locked position shown in FIG. 5, cylinder lock 130 is next to the handle 104 and prevents movement of the handle 104 in the second direction, thereby preventing opening of the door 21. When the cylinder lock 130 is unlocked and removed, the handle 104 and bolt 106 are free to move in the second direction (e.g., to the left in FIG. 5).

Figure 6:
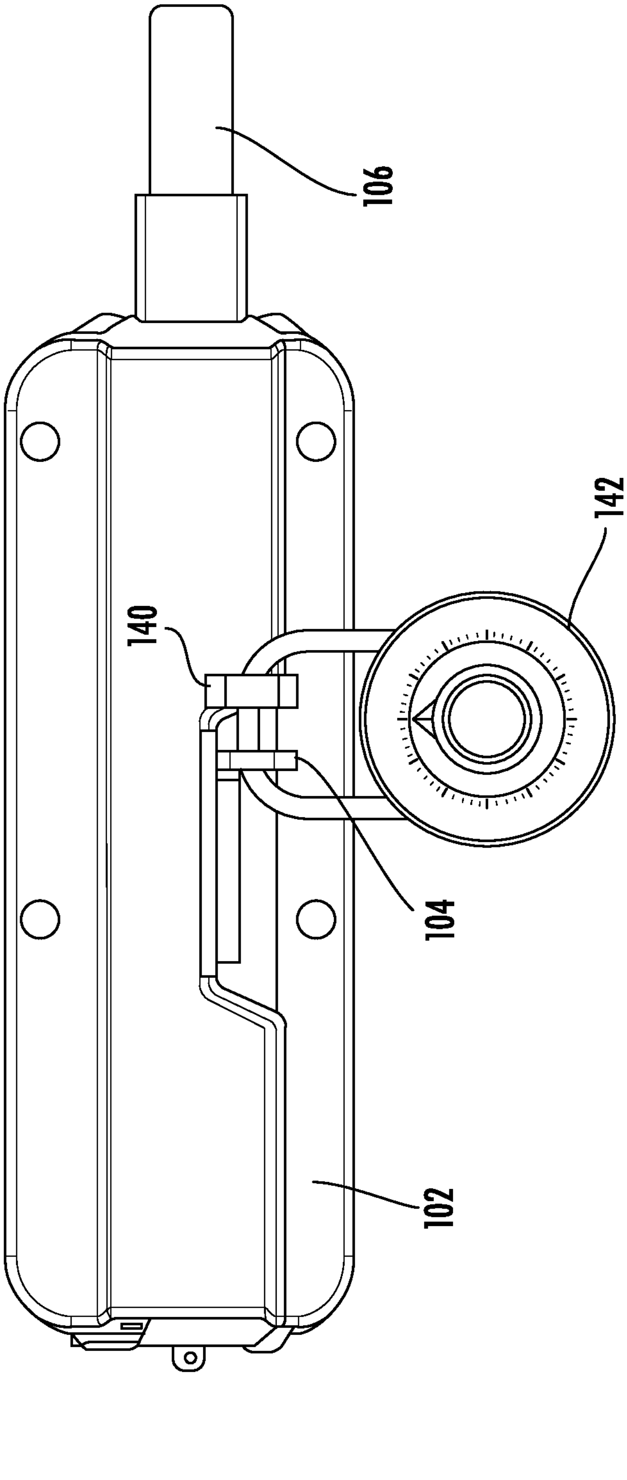
FIG. 6 depicts a door latch assembly in an example embodiment.

FIG. 6 depicts a lockable, blocking member in another embodiment. In FIG. 6 the lockable, blocking member is a tab 140 having a hole formed therethrough. The handle 104 also has a hole formed therethrough. A lock 142 may be placed through the holes in the tab 140 and the handle 104 to prevent movement of the handle 104 in the second direction, thereby preventing opening of the door 21. When the lock 142 is unlocked and removed, the handle 104 and bolt 106 are free to move in the second direction (e.g., to the left in FIG. 6).

FIGS. 7A-7F depict a removable, lockable, blocking member in another embodiment. The removable, lockable, blocking member includes a base plate 300 having a base plate tab 302 extending generally perpendicular to the base plate 300. An arm 304 is rotatably connected to the base plate 300. The arm 304 includes an arm tab 306 extending generally perpendicular to the arm 304. Both the base plate tab 302 and the arm tab 306 include a hole formed therein for receiving a lock.

Figure 7A:
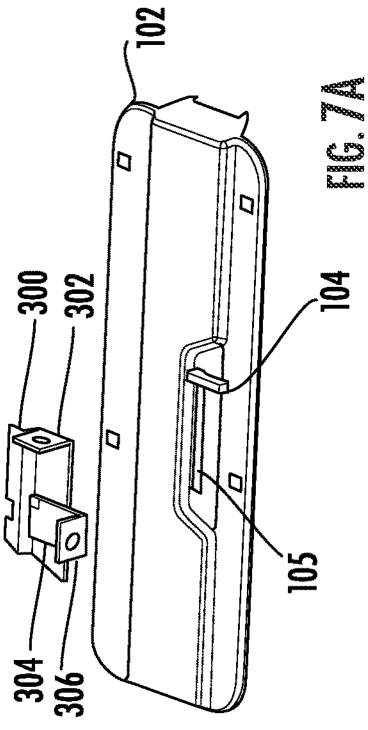
FIGS. 7A-7F depict a door latch assembly in an example embodiment.
Figure 7B:
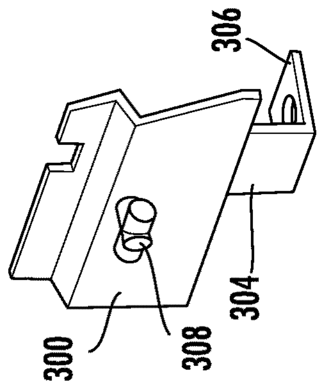

Referring to FIG. 7B, arm 304 is rotatably connected to base plate 300 by a pin 308 connected to the arm 304 that extends through the base plate 300. The pin 308 includes two ears 310 (FIG. 7D) that extend perpendicularly to a longitudinal axis of the pin 308, to define a T-shaped end of the pin 308.

Figure 7C:
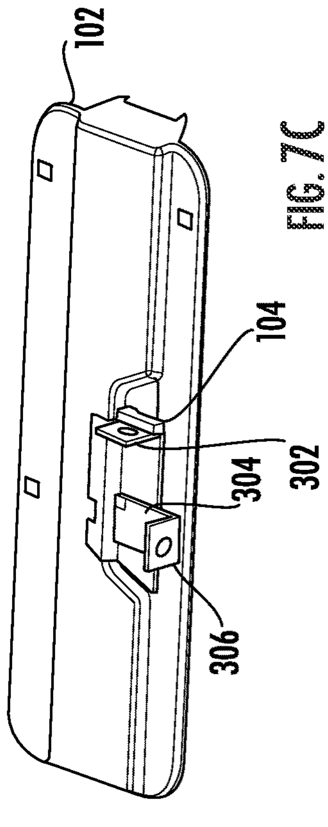
Figure 7D:
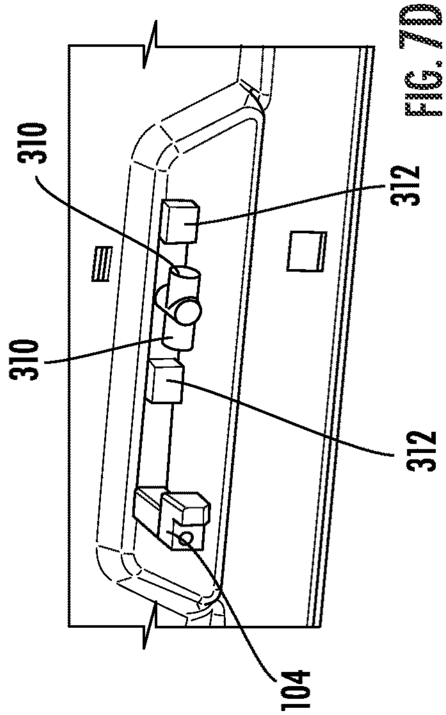

FIG. 7C shows the base plate 300 mounted to the housing 102. The ears 310 of pin 308 are placed in slot 105 (FIG. 7A) in which the handle 104 travels. The handle 104 must be in the bolt 106 extended position for the base plate 300 to fit the housing 102. The base plate tab 302 is positioned adjacent to the handle 104. FIG. 7D shows a rear view of FIG. 7C. As shown in FIG. 7D, the base plate 300 includes two nubs 312 to align the base plate 300 with the slot 105. As shown in FIG. 7D, the ears 310 of the pin 308 are parallel to the longitudinal axis of the slot 105, when installed.

Figure 7F:
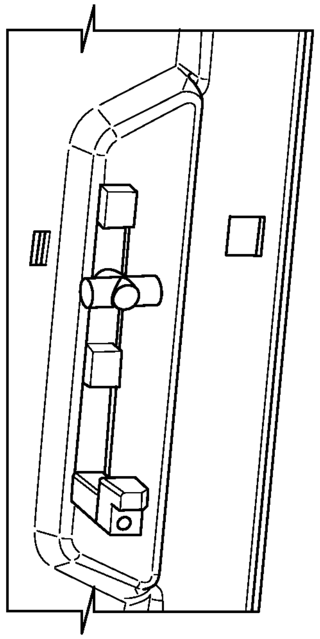
Figure 7E:
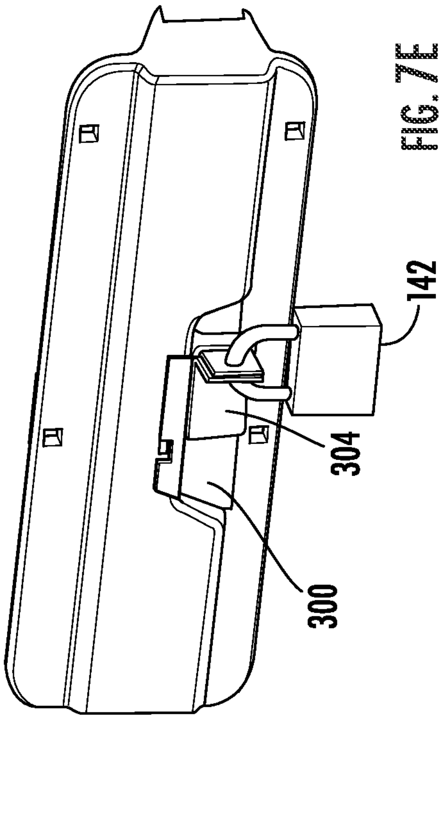

FIG. 7E shows the arm 304 rotated so that the hole in the arm tab 306 and the hole in the base plate tab 302 are aligned. A lock 142 may be placed through the hole in the arm tab 306 and the hole in the base plate tab 302 to prevent removal of the base plate 300. FIG. 7F shows a rear view of FIG. 7E. As shown in FIG. 7F, the ears 310 of the pin 308 are perpendicular to the longitudinal axis of the slot 105. This holds the base plate 300 snug against the housing 102. When the lock 142 is unlocked and removed, the arm 304 may be rotated freeing the base plate 300 from the housing 102. When the base plate 300 is removed from the housing 102, the handle 104 and the bolt 106 are free to move in the second direction (e.g., to the left in FIG. 7A).

Figure 8:
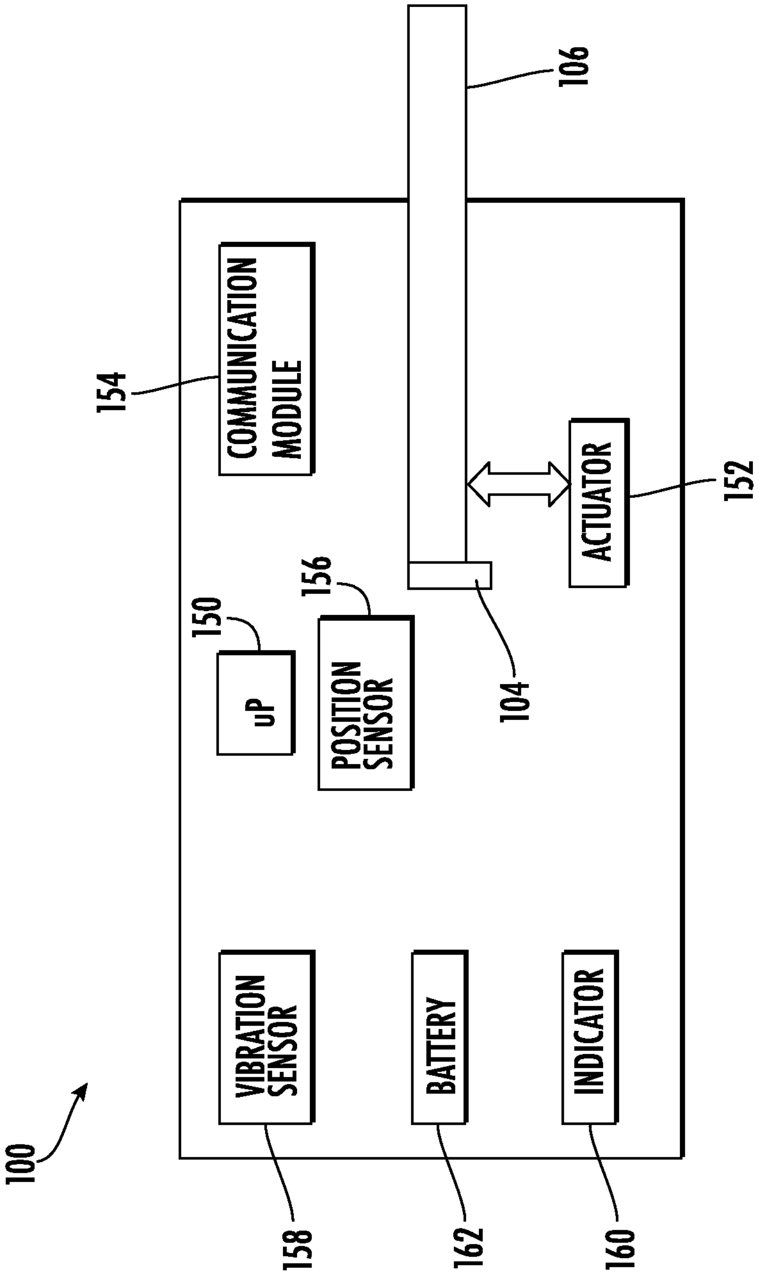
FIG. 8 depicts components a door latch assembly in an example embodiment.

FIG. 8 depicts components of the door latch assembly 100 in an example embodiment. The door latch assembly 100 includes a controller 150, which may be implemented using a general-purpose microprocessor executing a computer program stored on a storage medium to perform the operations described herein. Alternatively, controller 150 may be implemented in hardware (e.g., ASIC, FPGA) or in a combination of hardware/software.

An actuator 152 is in communication (e.g., via wiring or circuit board) with the controller 150. The actuator 152 applies a force on the bolt 106. In some embodiments, the actuator 152 can move the bolt 106 in the first direction (e.g., to the right) to extend the bolt 106 from the housing 102. The actuator 152 can also move the bolt 106 in the second direction (e.g., to the left) to retract the bolt 106 towards the housing 102. The actuator 152 can also prevent the bolt 106 from moving. Exemplary actuators are described in further detail herein.

A communication module 154 is in communication (e.g., via wiring or circuit board) with the controller 150. The communication module 154 allows the controller 150 to communicate with external systems, as described herein with reference to FIG. 11. The communication module 154 may be implemented using known devices that provide wireless communications, such as wireless network modules (e.g., WiFi or 802.11x), cellular modules (e.g., 5G), LoRaWAN modules, Bluetooth modules, etc. The communication module 154 may include multiple modules, providing multiple communication protocols, for example, both Bluetooth and LoRaWAN.

A position sensor 156 is in communication (e.g., via wiring or circuit board) with the controller 150. The position sensor 156 determines the status of the bolt 106. The position sensor 156 can determine if the bolt 106 is in a first, extended position (e.g., to the right in FIG. 2) or a second, retracted position (e.g., to the left in FIG. 2). The position sensor 106 may use a mechanical switch, a reed switch, a ferromagnetic sensor (e.g., Hall effect sensor), an optical sensor, a capacitive sensor, etc. Multiple position sensors 156 may be used. For example, a position sensor 156 may be located at each end of the length of travel of the handle 104 or the bolt 106.

A vibration sensor 158, when present, is in communication (e.g., via wiring or circuit board) with the controller 150. The vibration sensor 158 may be used to detect excessive force on the door latch assembly 100. As described in further detail herein, if excessive force is detected by the vibration sensor 158, the controller 150 can generate an alert to a remote system. The vibration sensor 158 may be a motion sensor, G-force sensor, accelerometer, or other type of sensor capable of detecting attack.

An indicator 160, when present, provides information to a user of the door latch assembly 100. The indicator 160 may be a multicolor LED that provides a visual indication. The indicator 160 may generate various indicia, such as blinking green light on extending or retracting of the bolt 106, a yellow light to indicate low battery and a red light to indicate an overlock mode. The indicator 160 may be a sounder or buzzer that provides an audible indicia to a user.

A battery 162 provides power to the components of the door latch assembly 100. The controller 150 monitors battery level (e.g., voltage) and can modify the indicator 160 when a low battery condition is detected.

Figure 9:
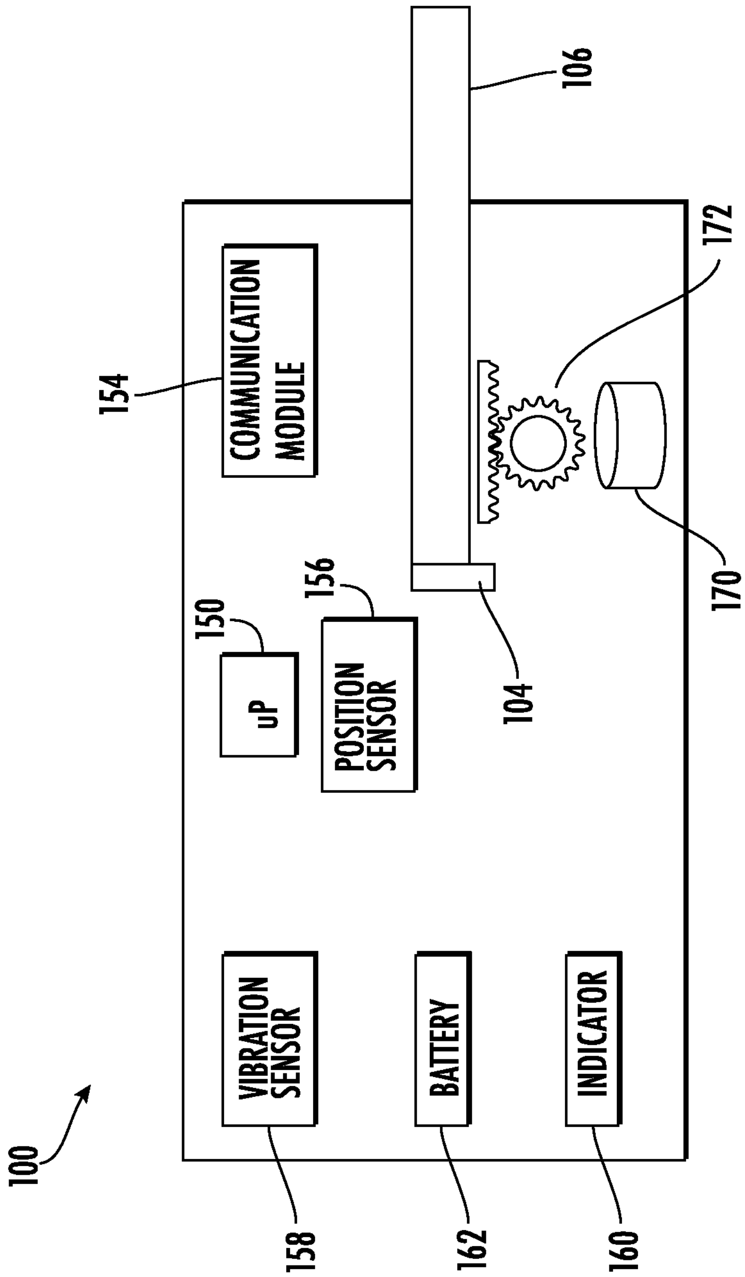
FIG. 9 depicts components a door latch assembly in an example embodiment.

FIG. 9 depicts an example embodiment of the actuator 152. In FIG. 9, the actuator includes a motor 170 configured to move the bolt 106 (and handle 104) in the first direction (e.g., to the right) or in the second direction (e.g., to the left). The motor 170 can also prevent the bolt 106 from moving. The motor 170 may interact with the bolt 106 by a gearing 172, such as a rack and pinion gearing, worm gearing, etc. In alternate embodiments, the motor 170 is a magnetic device that moves the ferromagnetic bolt 106 by generating a magnetic field of proper polarity. In other embodiments, the motor 170 can move a stop or blocking member into and out of engagement with the bolt 106 to prevent or allow movement of the bolt 106.

Figure 10:
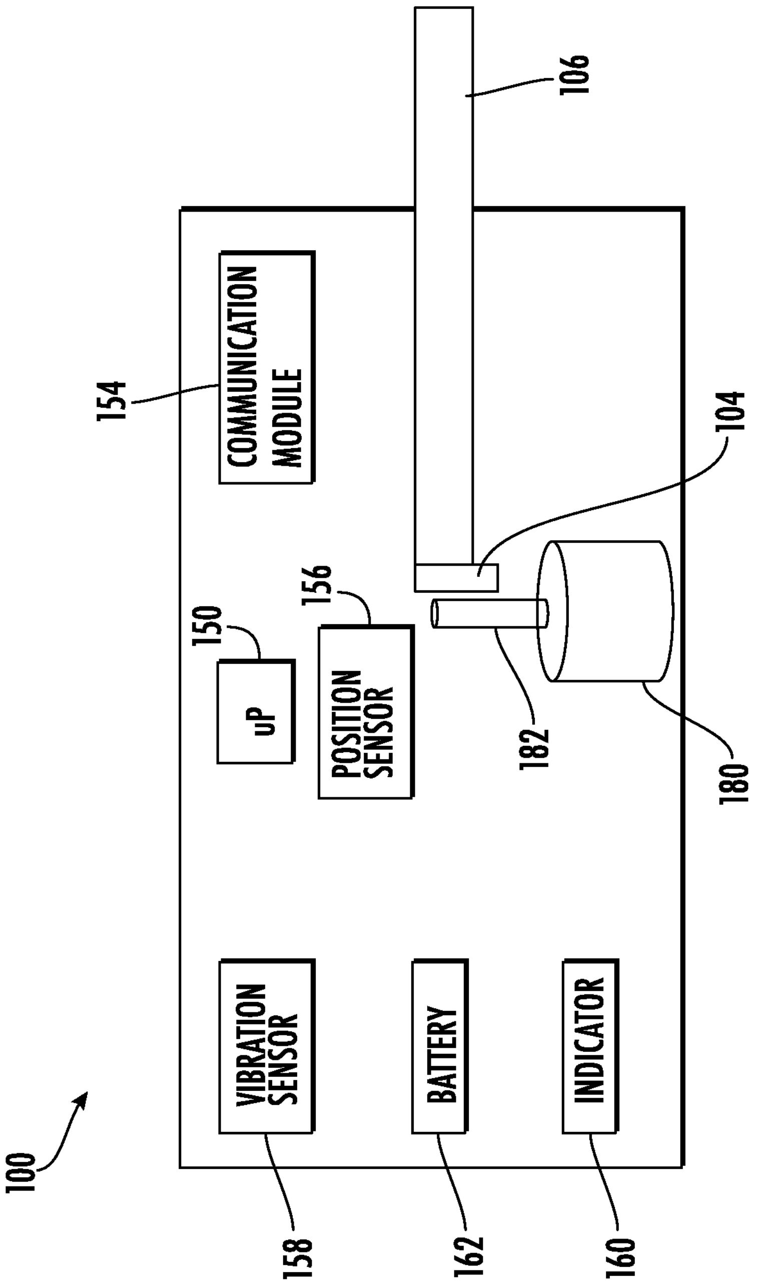
FIG. 10 depicts components a door latch assembly in an example embodiment.

FIG. 10 depicts an example embodiment of the actuator 152. In FIG. 10, the actuator includes a force device 180 and stop 182. The force device 180 can move the stop 182 into a first position to prevent movement of the bolt 106 and a second position to allow movement of the bolt 106. The force device 180 may be a bistable solenoid that changes state of the stop 182 in response to a signal from the controller 150. This embodiment may not require any holding power from the battery 162 to prevent the bolt 106 from moving. The stop 182 be moved linearly or rotationally between the first position and the second position.

Figure 11:
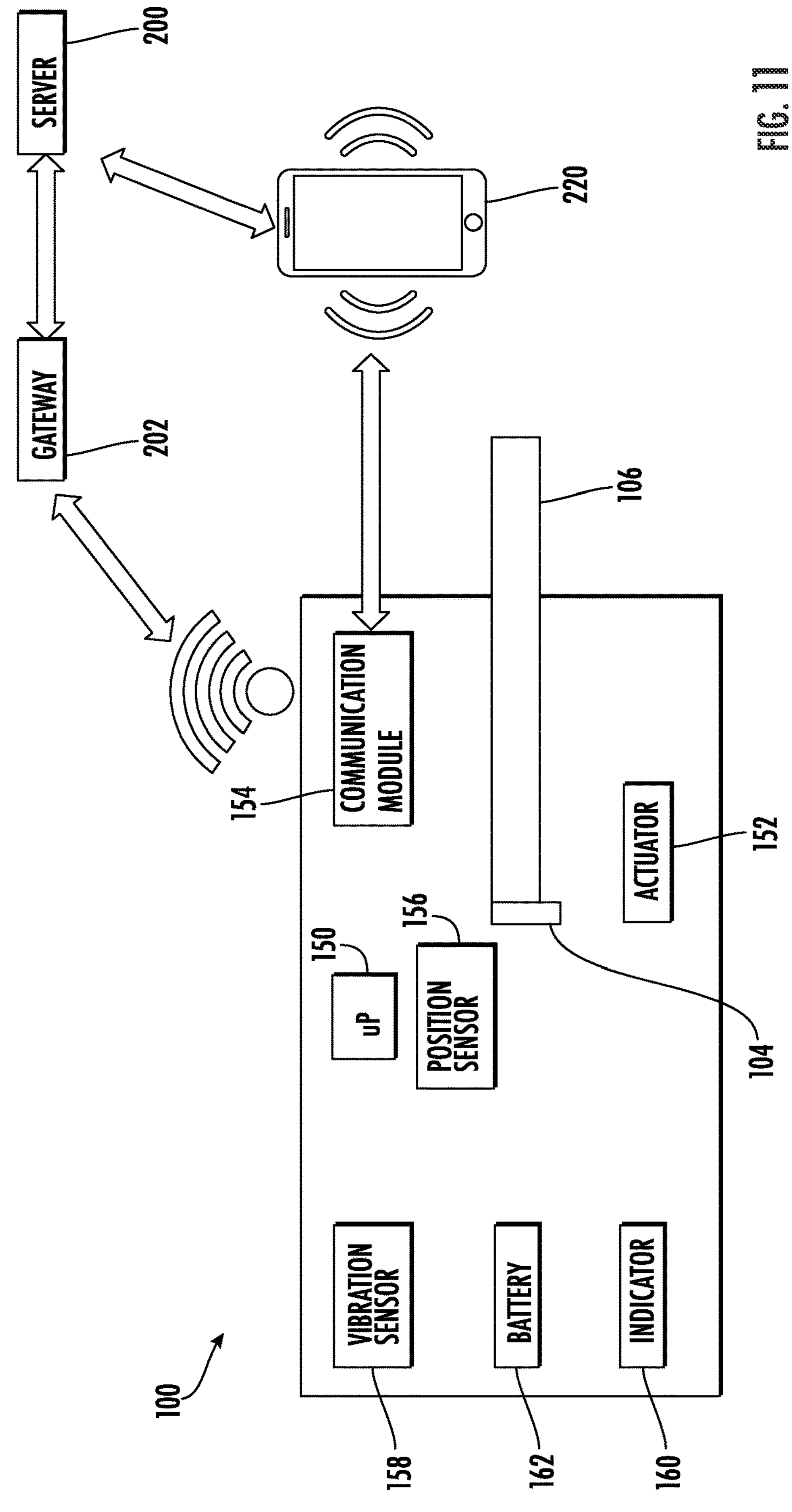
FIG. 11 depicts communications between a door latch assembly, a remote system, and a mobile device in an example embodiment.

FIG. 11 depicts communications between the door latch assembly 100, a mobile device 220 and a remote system 200. As shown in FIG. 11, the communication module 154 is in bidirectional, wireless communication with a remote system 200, such as a computer server. In FIG. 11, the communication module 154 communicates with the remote system 200 through gateway 202, such as a wireless access point. The communication module 154 may communicate with the remote system 200 directly, if using a communication protocol of suitable range (e.g., cellular). The communication module 154 may communicate with the remote system 200 using mesh techniques, where each door latch assembly 100 operates as a node in a mesh network.

A mobile device 220 may be used to communicate with the door latch assembly 100 through the communication module 154. The mobile device 220 may be a processor equipped device such as a mobile phone, a tablet, a laptop computer, etc., equipped with a communication module compatible with communication module 154. As described further herein, the mobile device 220 may access the server 200 to obtain a credential to override an overlock condition at the door latch assembly 100. The credential may include a numeric code, a data packet, a data encoded via a cryptographic operation such as encryption, or a digital signature. The credential includes data that can be verified by the controller 150 to give permission to override the overlock condition and allow the controller 150 to unlock the lock to allow the handle 104 and bolt 106 to move freely.

FIG. 11 shows a single door latch assembly 100 in communication with the remote system 200. In typical installations, a large number of door latch assemblies 100 will be in communication with the remote system 200. One example installation is a self-storage facility where each self-storage unit is fitted with a door latch assembly 100.

Figure 12:
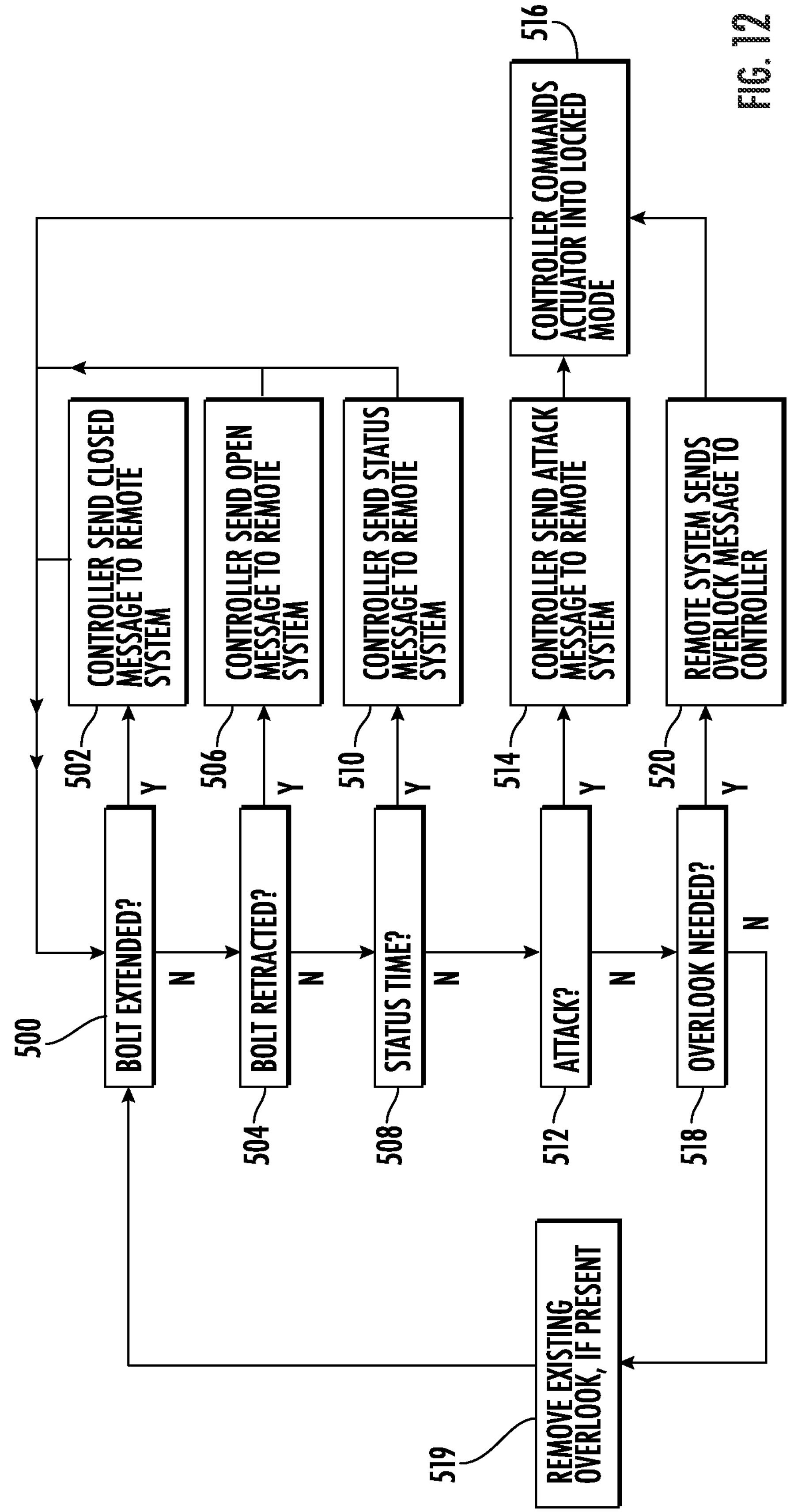
FIG. 12 depicts messaging to and from the door latch assembly in an example embodiment.

FIG. 12 depicts messaging to and from the door latch assembly 100 and the remote system 200 in an example embodiment. The order of the operations in FIG. 12 is an example, and messages may be sent in any order. The messaging between the door latch assembly 100 and the remote system 200 allows the remote system 200 to collect current status of all door latch assemblies 100 and control an overlock mode of one or more door latch assemblies 100.

At 500, the controller 150 determines if the bolt 106 has been extended (e.g., moved in the first direction), through position sensor 156. If so, the controller 150 sends a closed message to the remote system 200 at 502. At the same time, the controller 150 records an audit record indicating the date/time that the bolt was closed. The audit record may be stored in internal memory of the controller 150 or a separate non-volatile memory.

At 504, the controller 150 determines if the bolt 106 has been retracted (e.g., moved in the second direction), through position sensor 156. If so, the controller 150 sends an open message to the remote system 200 at 506. At the same time, the controller 150 records an audit record indicating the date/time that the bolt was opened. The audit record may be stored in internal memory of the controller 150 or a separate non-volatile memory. As an optional operation, the remote system 200 may send a notification to one or more users of the door latch assembly 100 that the bolt 106 has been opened (e.g., moved in the second direction).

At 508, the controller 150 determines if it is time for a status message. A status message may be communicated from the controller 150 to the remote system 200 at a frequency (e.g., every X hours). The status message may include status of the bolt 106 (e.g., opened or closed), battery level, etc. If needed, the status message is sent from the controller 150 to the remote system 200 at 510. At the same time, the controller 150 records an audit record indicating the date/time and the status message. The audit record may be stored in internal memory of the controller 150 or a separate non-volatile memory.

The status message may indicate the need for maintenance at the door latch assembly 100. In one example, if status messages are missing (e.g., not being transmitted on schedule), the remote system 200 may initiate a maintenance action at the door latch assembly 100. Missing status messages could be the result of a low/dead battery or a malfunction of one or more components of the door latch assembly 100. If the status message indicates a low battery, maintenance personnel may be directed to replace the battery 162.

At 512, the controller 150 determines if the door latch assembly 100 is under attack, through vibration sensor 158. The vibration sensor 158 may continuously provide the current vibration sensed to the controller 150. If the controller 150 detects that the current vibration exceeds a limit, then the controller 150 determines that the door latch assembly 100 is under attack. Alternatively, the vibration sensor 158 may only generate a signal when the current vibration exceeds a limit. In either case, if the current vibration exceeds a limit, the controller 150 sends an attack message to the remote system 200 at 514.

At 516, the controller 150 can also place the door latch assembly 100 into overlock mode. Overlock mode refers to a situation where the actuator 152 prevents the bolt 106 from being retracted into the housing 102. As there is already a lock on the door latch assembly 100 through the lockable, blocking member, restricting movement of the bolt 106 by the actuator 152 is referred to as overlocking or overlock mode.

At 518, the remote system 200 may determine that overlock mode is required at the door latch assembly 100. Overlock mode may be required if a user of the door latch assembly 100 has not paid an outstanding invoice. This may occur in a self-storage facility, where a renter of a self-storage unit has not paid their invoice. The overlock mode may also be required to prevent anyone from accessing the area blocked by door 21, such as for crime scene preservation.

If an overlock mode is needed, the remote system 200 sends an overlock message to the controller 150 at 520. From 520, the process flows to 516, where the controller 150 commands the actuator 152 to prevent the bolt 106 from being retracted into the housing 102.

If at 518, no overlock is need, flow proceeds to 519 where any exiting overlock is removed, if present. In order to exit overlock mode, the proper credential must be presented to the controller 150. The credential may be sent from the remote system 200 to the controller 150. For example, once a user pays an outstanding invoice, the remote system 200 can send the credential to the controller 150 to cease overlock mode. Alternatively, a user with a mobile device 220 may physically approach the door latch assembly 100 and interact with the controller 150, through the communication module 154. The credential may be sent from the mobile device 220 (e.g., a mobile phone) to the controller 150 to cease overlock mode.

The door latch assembly 100 is normally operated in a mode where the actuator 152 is not blocking the movement of the bolt 106 and the storage unit door 21 can be freely unlocked, opened, closed, relocked by sliding the handle 104 back and forth and rolling the door up and down. A tenant of the storage unit can lock the lockable, blocking member by, for example, applying the lock 142 to the strap 124, locking member 140, base plate tab 302 and the arm tab 306, or they can apply the lock 130 and mechanically block the movement of the handle 104 and bolt 106. When the tenant returns they can remove the lock and access the unit at will. The door latch assembly 100 will report the access by the position sensor 156 and will also report a daily status message and attack event if it occurs. When the tenant of the storage unit has a delinquent account, then the system can send a message to overlock the door latch assembly 100 and cause the actuator 152 to move and prevent the bolt 106 from moving regardless of whether the user supplied lock is present or not. The overlock condition can be removed as described above.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A door latch assembly comprising:
a housing;
a bolt configured to the extend from the housing in a first direction and retract into the housing in a second direction;
a handle connected to the bolt;
a lockable, blocking member configured to prevent movement of the bolt;
a controller configured to place the door latch assembly into an overlock mode;
an actuator in communication with the controller, the actuator configured to prevent movement of the bolt in the overlock mode;
wherein the lockable, blocking member comprises:
a base plate having a base plate tab extending from the base plate;
an arm rotatably connected to the base plate, the arm including an arm tab extending from the arm;
a base plate tab hole in the base plate tab;
an arm tab hole in the arm tab;
wherein the base plate tab hole and the arm tab hole are configured to be aligned with upon rotation of the arm relative to the base plate;
a vibration sensor; wherein the controller is configured to place the door latch assembly into the overlock mode in response to the vibration sensor; wherein the controller is configured to send an attack message from the door latch assembly to a remote system in response to the sensed vibration.

2. The door latch assembly of claim 1, wherein:
the controller is configured to place the door latch assembly into the overlock mode in response to a message from a remote system.

3. The door latch assembly of claim 1, further comprising:
a position sensor in communication with the controller;
the position sensor configured to detect if the bolt is extended from the housing in the first direction or retracted into the housing in the second direction.

4. The door latch assembly of claim 1, further comprising:
a communication module configured to provide communication between the controller and a remote system.

5. The door latch assembly of claim 4, wherein the controller places the door latch assembly into the overlock mode in response to a message from the remote system.

6. The door latch assembly of claim 1, wherein the actuator comprises a motor.

7. The door latch assembly of claim 1, wherein the actuator comprises a stop.

8. A method of operating a door latch assembly having:
a housing;
a bolt configured to the extend from the housing in a first direction and retract into the housing in a second direction;
a handle connected to the bolt;
a lockable, blocking member configured to prevent movement of the bolt;
a controller configured to place the door latch assembly into an overlock mode;
an actuator in communication with the controller, the actuator configured to prevent movement of the bolt in the overlock mode;
wherein the lockable, blocking member comprises:
a base plate having a base plate tab extending from the base plate;
an arm rotatably connected to the base plate, the arm including an arm tab extending from the arm;
a base plate tab hole in the base plate tab;
an arm tab hole in the arm tab;
wherein the base plate tab hole and the arm tab hole are configured to be aligned with upon rotation of the arm relative to the base plate;
the method comprising:
determining, by a remote server, that an overlock mode is required at the door latch assembly;
sending, from the remote server to the door latch assembly, a message to enter the overlock mode.

9. The method of claim 8, further comprising:
detecting at the door latch assembly that a bolt has been extended;
sending a closed message from the door latch assembly to the remote server.

10. The method of claim 9, further comprising:
storing the closed message in an audit record contained in memory of the door latch assembly.

11. The method of claim 8, further comprising:
detecting at the door latch assembly that a bolt has been retracted;
sending an open message from the door latch assembly to the remote server.

12. The method of claim 11, further comprising:
storing the open message in an audit record contained in memory of the door latch assembly.

13. The method of claim 11, further comprising:
sending the open message to a user.

14. The method of claim 8, further comprising:
periodically sending a status message from the door latch assembly to the remote server.

15. The method of claim 14, further comprising:
the remote server initiating maintenance of the door latch assembly in response to a missing status message.

16. The method of claim 8, further comprising:
sensing vibration at the door latch assembly;
sending an attack message from the door latch assembly to the remote server in response to the sensed vibration.

17. The method of claim 8, further comprising:
determining, at the remote server, that the overlock mode is not required at the door latch assembly;
providing a credential to the door latch assembly to end the overlock mode.

18. The door latch assembly of claim 1, wherein the actuator comprises a bistable solenoid and a stop, the bistable solenoid configured to move the stop into a first position to prevent movement of the bolt and a second position to allow movement of the bolt.

* * * * *